(12) United States Patent
Davoust et al.

(10) Patent No.: US 8,225,322 B2
(45) Date of Patent: Jul. 17, 2012

(54) CONTACT CENTRE WITH IMPROVED MANAGEMENT AND ALLOCATION OF RESOURCES

(75) Inventors: Pascal Davoust, Le Perreux sur Marne (FR); Arnaud Vergnol, Beauchamps (FR)

(73) Assignee: Alcatel Lucent, Paris (FR)

( * ) Notice: Subject to any disclaimer, the term of this patent is extended or adjusted under 35 U.S.C. 154(b) by 1039 days.

(21) Appl. No.: 12/027,640

(22) Filed: Feb. 7, 2008

(65) Prior Publication Data

US 2008/0196035 A1   Aug. 14, 2008

(30) Foreign Application Priority Data

Feb. 8, 2007 (FR) .................................. 07 53130

(51) Int. Cl.
*G06F 9/455* (2006.01)
*G06F 9/46* (2006.01)
(52) U.S. Cl. .................. 718/104; 718/1; 718/100
(58) Field of Classification Search ............. 718/1, 100, 718/104; 379/37; 706/47; 709/231, 203
See application file for complete search history.

(56) References Cited

U.S. PATENT DOCUMENTS

| | | | | |
|---|---|---|---|---|
| 5,982,873 A * | 11/1999 | Flockhart et al. | ........ | 379/266.02 |
| 6,192,122 B1 * | 2/2001 | Flockhart et al. | ........ | 379/266.01 |
| 6,453,038 B1 * | 9/2002 | McFarlane et al. | ...... | 379/265.05 |
| 6,744,878 B1 * | 6/2004 | Komissarchik et al. | . | 379/265.03 |
| 7,058,589 B1 * | 6/2006 | Leamon et al. | .............. | 705/7.13 |
| 2002/0150229 A1 * | 10/2002 | Riihinen et al. | ......... | 379/221.01 |
| 2003/0115353 A1 | 6/2003 | Deryugin et al. | | |
| 2004/0062380 A1 * | 4/2004 | Delaney | .................. | 379/265.02 |
| 2004/0083195 A1 | 4/2004 | McCord et al. | | |

OTHER PUBLICATIONS

Alcatel Lucent: "Genesys Real-Time Customer Interaction Suite"—Online Jan. 28, 2007, pp. 1-2, XP002449724.
Alcatel Lucenet: "Genesys Customer Interaction Management Platform"—Online Jan. 26, 2007, pp. 1-3, XP002449725.
Genesys: "Genesys 7—Customer Interaction Management Platform" Online—Aug. 21, 2006, XP002449723.

* cited by examiner

*Primary Examiner* — Thomas Lee
*Assistant Examiner* — Samantha Hoang
(74) *Attorney, Agent, or Firm* — Fay Sharpe LLP

(57) ABSTRACT

Process for management resources each resource having one or several characteristics and, for each characteristic, a given category to which the resource belongs, this process comprising the following operations:
a) identify (101) one or several characteristics required for the resources,
b) identify (102) a group of resources with the required characteristic(s),
c) for each resource in said group, and for each characteristic of the resource, associate (103) the resource category with a time, with a value that depends on the category,
d) assign (104) a magnitude in time to each resource, called adhesion, equal to the greatest time of the resource characteristics.

3 Claims, 4 Drawing Sheets

CONTACT CENTRE WITH IMPROVED MANAGEMENT AND ALLOCATION OF RESOURCES

The invention relates to a contact centre in which the management and allocation of resources are improved. When a customer contacts such a contact centre, he would like his call to be routed to the most appropriate resource deal with his request, among the available resources, and that the waiting time should be minimal. In general, the resources are agents (humans), but the invention is also applicable in the case in which a resource consists of a machine. To achieve this, the centre must reliably allocate resources while minimizing waiting time for the user.

In such a centre, resource management may firstly involve anticipation actions (in other words actions undertaken independently or before a later request)—in particular, these anticipation actions include sorting and classifying of resources such as agents, and secondly reactive actions, in other words actions undertaken after a request is received and in response to it): these actions may include allocation of resources depending on expressed or latent needs.

More precisely, for example it may be useful to sort and classify agents in advance as a function of predefined characteristics (linguistic skills, technical skills, location, availability, etc.), while later on agents may be allocated as a function of instructions received from customers through various communication means such as a telephony system (fixed or mobile), a chat system or a webmail system, a Short Message Service (SMS), or a Multimedia Message Service (MMS) or a Unified Message System (UMS). To achieve this, one or several characteristics required for an agent (for example technical skills) are identified from received instructions, and an attempt is made to route the instruction to an agent whose characteristics correspond to the required characteristics as closely as possible.

One general resource management process is described in American patent application US 2005/0125274 (Nastacio et al.). Various methods and systems for management of resources applied to contact centres or to call centres are also described in American patent applications US 2004/0083195 (McCord et al.), US 2003/0115353 (Deryugin et al.), US 2004/0225679 (Oran), US 2006/0143058 (Brunet et al.), US 2006/0123060 (Allen et al.), US 2004/0005048 (Agusta) and in the American patent U.S. Pat. No. 7,088,814 (Schaffer et al.).

Despite their diversity, none of these documents divulges a contact centre that is capable of satisfactorily selecting an agent when characteristics of resources are heterogeneous. It may be necessary to select, sort or classify agents as a function of heterogeneous characteristics such as firstly a particular technical skill (for example knowledge of such a data base), skill for which for each agent may be assigned a predefined expertise level, and secondly the average call processing time. Known contact centres usually comprise means for giving priority to only one of the characteristics (for example the processing time) or the other characteristic(s) (the technical skill). The choice of a single characteristic as the priority characteristic is necessarily subjective and it may be inadequate because the needs of the user are different from the criteria applied to make this choice.

The result is that known contact centres cannot reliably allocate resources while minimizing waiting time for the user.

The invention is aimed particularly at overcoming this disadvantage.

To achieve this, a first aspect of the invention divulges a contact centre, comprising:

a resource database to memorize the corresponding identities of a number of resources each with one or several characteristics, and for each characteristic of each resource, to memorize a predetermined category to which the resource considered belongs;

means of receiving an instruction from a customer;

means of starting from this instruction to identify one or several characteristics required for a resource to be selected among the plurality of resources;

means of identifying a group of resources with the required characteristic(s) among the resources;

means of selecting a resource within this group, as a function of the categories memorized in the database;

and means of routing the instruction to the resource thus selected;

characterized in that:

the resource database comprises means of memorizing a time representing this category, the means of selecting a resource within said group comprise:

means of assigning a magnitude in time called the adhesion and equal to the longest of the characteristic times of this resource, to each resource, and means of selecting a resource within said group as a function of the adhesions thus assigned.

Other advantages and purposes of the invention will become clear after reading the following description with reference to the appended drawings in which.

Figure 1:
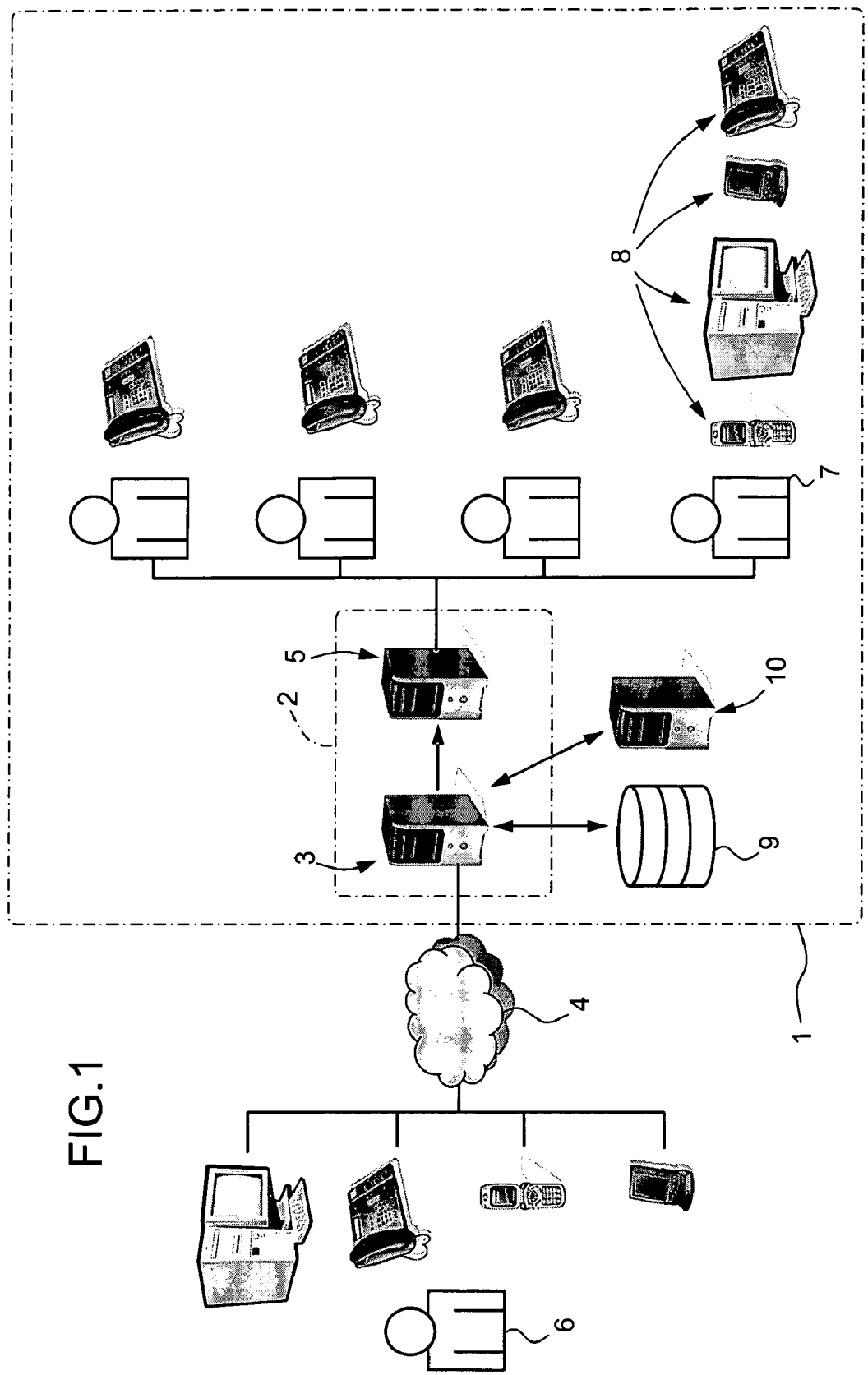
FIG. 1 is a diagrammatic view showing an example of a contact centre according to the invention.

FIG. 1 shows a communication system 1, comprising a central communication node 2 composed of two servers, namely a call server 3 connected to an external network 4, for example a Metropolitan Area Network (MAN) or a Wide Area Network (WAN) such as Internet, and a router server 5 connected to the call server 3.

According to one embodiment, the communication system 1 forms a Contact Centre organized to bring a customer 6 into relation with one or several human agents 7 or to transmit a request formulated by the customer 6 to an agent 7.

At least one communication terminal 8 that may be fixed (such as a computer on which a message service is installed, an analogue, digital or IP telephone) or mobile (such as a cell phone or a smart Personal Digital Assistant (PDA), also called a Smartphone), is assigned to each agent 7 and is connected to the router server 5. Each agent 7 (or possibly only some agents depending on their corresponding functions and responsibilities) may also be assigned several terminals 8, some of which may be fixed and others may be mobile. In the example illustrated on FIG. 1, some agents 7 only have a VoIP phone, while another agent may have an IP phone, a cell phone, a personal computer on which a message service is installed and a Smartphone.

Agents 7 have a number of predefined characteristics depending on the action field of the contact centre 1 (for example a hospital environment, mail order, after sales service or <<hotline>>, etc.), and may include particularly skills (for example technical skills related to the field of action, linguistic or legal skills, etc.) or particular situations (for example hierarchical levels).

For each characteristic specific to him or her, each agent 7 is classified in a category reflecting (or supposedly reflecting) the level of the agent 7 for said characteristic. This category may be an integer number, a qualitative (such as <<beginner>>, <<expert>>, etc.).

The centre 1 has a resources database 9 connected to the call server 3, in which data are stored for each agent 7, including an identifier of the agent 7, the characteristics of the agent, and for each characteristic, the category to which the agent 7 belongs.

If necessary, the centre 1 also comprises a localization server 10 connected to the call server 3 which at the request by the call server 3 can obtain information about the geographic location of an agent 7.

For example, tables 1.1 to 1.5 below list possible categories for a linguistic skill (in this case in English, table 1.1), for a technical skill (in the field of cardiology, table 1.2, contract techniques, table 1.3) and for a hierarchical position (within a medical department, table 1.4 or a legal department, table 1.5). For each category, one column contains a qualifier for this category, and another column contains an example of number representing this category.

TABLE 1.1

| Skill: English | Category: qualifier | Category: number |
|---|---|---|
| | Null | 0 |
| | Beginner | 1 |
| | Experienced | 2 |
| | Fluent | 3 |
| | Bilingual | 4 |

TABLE 1.2

| Skill: cardiology | Category: qualifier | Category: number |
|---|---|---|
| | Null | 0 |
| | Beginner | 1 |
| | Experienced | 2 |
| | Expert | 3 |

TABLE 1.3

| Skill: contract techniques | Category: qualifier | Category: number |
|---|---|---|
| | Null | 0 |
| | Beginner | 1 |
| | Experienced | 2 |
| | Expert | 3 |

TABLE 1.4

| Hierarchical position (medical department) | Category: qualifier | Category: number |
|---|---|---|
| | Nurse | 0 |
| | Head nurse | 1 |
| | Doctor | 2 |
| | Department head | 3 |

TABLE 1.5

| Hierarchical position (legal department) | Category: qualifier | category: number |
|---|---|---|
| | Legal assistance | 0 |
| | Junior jurist | 1 |
| | Experienced jurist | 2 |
| | Senior jurist | 3 |

The category may also be formulated in Boolean form, as shown in the following examples (tables 1.6 and 1.7) that illustrate the case in which the agent does or does not satisfy a criterion (in this case belonging to the cardiology department, table 1.6, and belonging to the legal department, table 1.7):

TABLE 1.6

| Belonging to the cardiology department | Category: qualifier | Category: number |
|---|---|---|
| | False | 0 |
| | True | 1 |

TABLE 1.7

| Belonging to the legal department | Category: qualifier | Category: number |
|---|---|---|
| | False | 0 |
| | True | 1 |

Another characteristic for an agent may be travel time, if the agents 7 (or some of them) are mobile so that they can provide a service to a customer. Each agent is then assigned to one category among several categories depending on the travel time of the agent 7, for example measured in minutes from his or her current location to a predefined point at which the customer is located. This travel time is calculated as a function of data provided by the localizing server 10,

TABLE 1.8

| Travel time to a predefined point | Category (travel time in minutes) |
|---|---|
| | 0 min |
| | 2 min |
| | 5 min |
| | 10 min |
| | 20 min or more |

According to the characteristics, it can be seen that the categories are heterogeneous. Thus, assuming that the characteristics for a given agent include skills in cardiology, the hierarchical position, belonging to the cardiology department and travel time to a predefined point, it can be seen that the categories are expressed in different units, for example as illustrated in table 1.9 below:

TABLE 1.9

| Characteristics | Category |
|---|---|
| Skill: cardiology | 1 |
| Hierarchical position | Doctor |
| Belonging to the cardiology department | False |
| Travel time | 10 min |

In practice, for good resource management, it may be useful to select, sort or classify agents as a function of their characteristics. To achieve this, it appears essential to make comparisons between categories of agents.

This comparison does not create any problems for a single characteristic. Thus, for the <<skill: cardiology>> characteristic, a category 2 agent will be said to have priority over a category 1 agent. Similarly, for the <<hierarchical position>> characteristic, a doctor will be said to have priority over a nurse.

However, the classification of agents becomes problematic when several categories have to be combined, in other words taken together. Thus, in the example mentioned above, the question arises of how to classify a category 1 doctor (Beginner) in cardiology and a category 2 nurse (Experienced) in cardiology.

A known contact centre comprises means for memorizing a predetermined hierarchy of categories with respect to each other. Thus in the above example, a predetermined hierarchy may make the <<hierarchical position>> characteristic take priority over the <<skill: cardiology>> characteristic such that regardless of their skills in cardiology, a doctor agent will take priority over a nurse agent, regardless of the other characteristics of these two agents. In a known contact centre, all characteristics have to be hierarchised in advance, which requires a considerable number of arbitrary choices—to the detriment of the real needs of customers—and can lead to blockages when two characteristics are considered to be of equal importance.

The proposed contact centre solves this problem.

Principle:

Its operating principle is assignment of a time (expressed in a time unit such as a minute) to each category, for each characteristic of a resource, the value being a function of the category in which the resource is classified.

Application of this principle is illustrated below—for the characteristics mentioned above—in tables 2.1 to 2.7 which correspond to tables 1.1 to 1.7 respectively.

TABLE 2.1

| Skill: English | Category: qualifier | Category: number | Time (in minutes) |
|---|---|---|---|
| | Null | 0 | 20 min |
| | Beginner | 1 | 15 min |
| | Experienced | 2 | 5 min |
| | Fluent | 3 | 1 min |
| | Bilingual | 4 | 0 min |

TABLE 2.2

| Skill: Cardiology | Category: qualifier | Category: number | Time (in minutes) |
|---|---|---|---|
| | Null | 0 | 20 min |
| | Beginner | 1 | 10 min |
| | Experienced | 2 | 2 min |
| | Expert | 3 | 0 min |

TABLE 2.3

| Skill: contract techniques | Category: qualifier | Category: number | Time (in minutes) |
|---|---|---|---|
| | Null | 0 | 20 min |
| | Beginner | 1 | 10 min |
| | Experienced | 2 | 2 min |
| | Expert | 3 | 0 min |

TABLE 2.4

| Hierarchical position (medical department) | Category: qualifier | Category: number | Time (in minutes) |
|---|---|---|---|
| | Nurse | 0 | 20 min |
| | Head nurse | 1 | 10 min |
| | Doctor | 2 | 2 min |
| | Department head | 3 | 0 min |

TABLE 2.5

| Hierarchical position (legal service) | Category: qualifier | Category: number | Time (in minutes) |
|---|---|---|---|
| | Legal assistant | 0 | 20 min |
| | Junior jurist | 1 | 10 min |
| | Experienced jurist | 2 | 2 min |
| | Senior jurist | 3 | 0 min |

TABLE 2.6

| Belonging to the cardiology service | Category: qualifier | Category: number | Time (in minutes) |
|---|---|---|---|
| | False | 0 | 20 min |
| | True | 1 | 0 min |

TABLE 2.7

| Belonging to the legal service | Category: qualifier | Category: number | Time (in minutes) |
|---|---|---|---|
| | False | 0 | 20 min |
| | True | 1 | 0 min |

It can be seen that the time for some characteristics, time is a decreasing function of the category (for example for skills and the hierarchical position), while for others the time may be an increasing function of the category (for example for belonging to the cardiology department).

The expression of categories in time form provides a means of expressing the characteristics in a single, easily useable unit that, as we will see, can very much improve resource management in a contact centre.

Resource Management

Figure 2:
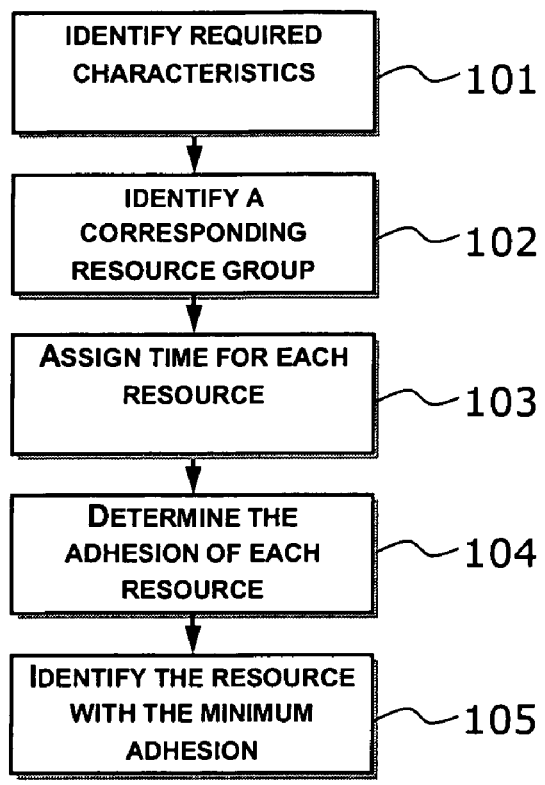
FIG. 2 is a diagram illustrating different steps of a first method of managing resources used in this example contact centre according to the invention.
Figure 3:
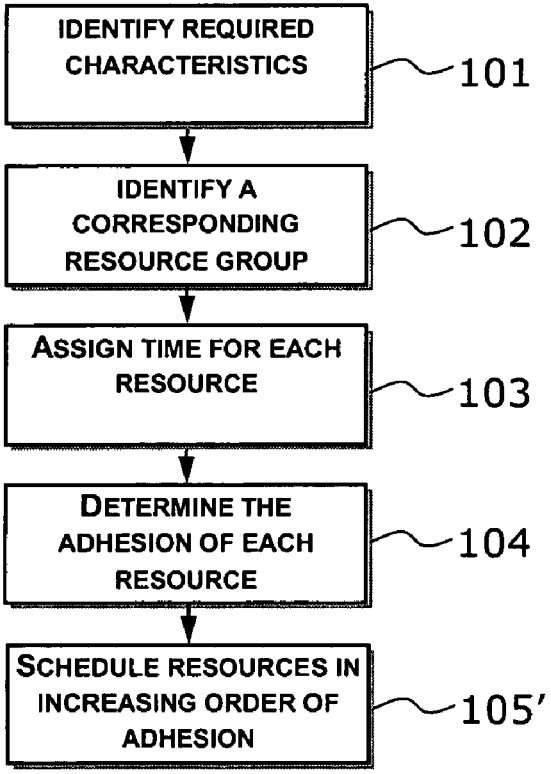
FIG. 3 is a diagram illustrating different steps in a second method of managing resources used in this example contact centre according to the invention.

One general method for managing resources illustrated on FIGS. 2 and 3, comprises a first operation 101 consisting of identifying one or several characteristics required for resources, depending on expressed or latent needs. A second operation 102 consists of identifying a group of resources with the required characteristic(s) among all the resources.

A third operation 103 consists of assigning a time to the category corresponding to each group resource thus identified, and for each characteristic of the resource, the time depending on said category, in application of the principle described above for.

Table 3.1 illustrates this: this table contains the data in table 1.9, plus another column containing the time corresponding to the categories in application of the method illustrated in tables 2.2, 2.4, 2.6 (except for the travel time which is already expressed in a time unit)

TABLE 3.1

| Characteristic | Category | Time |
|---|---|---|
| Skill: cardiology | 1 | 10 min |
| Hierarchical position | Doctor | 2 min |
| Belonging to the cardiology department | False | 20 min |
| Travel time | 10 min | 10 min |

A fourth operation 104 then consists of determining the time value equal to the greatest of the times in the resource characteristics, for each resource in the group: this time value is called the adhesion. For example, the adhesion for the resource identified in table 3.1 is equal to 20 min.

By definition, regardless of the characteristics of resources within a group, and regardless of the number of these characteristics, each resource comprises a unique adhesion.

The adhesion may then be used as the sole magnitude representative of the resources. Assuming that resource management needs are relatively limited, for example in the case of simple surveillance, the operations that have just been described (identification of required characteristics, identification of a group of resources with these characteristics, calculation of times, calculation of adhesion) may be sufficient.

Nevertheless, the concept of adhesion makes it possible to manage resources more precisely when it involves additional sorting, classification or even resource allocation operations. These operations may be considerably simplified due to the use of adhesion.

For a simple sorting of resources, an additional operation 105 may be sufficient, consisting of identifying the lowest adhesion resource within the group (FIG. 2).

As a variant, for a resource classification, the resource management method may include an additional operation 105' consisting of sorting resources in the group into increasing order of adhesion (FIG. 3).

We will now describe two example applications of the resource management method that has just been presented.

EXAMPLE 1

Figure 4:
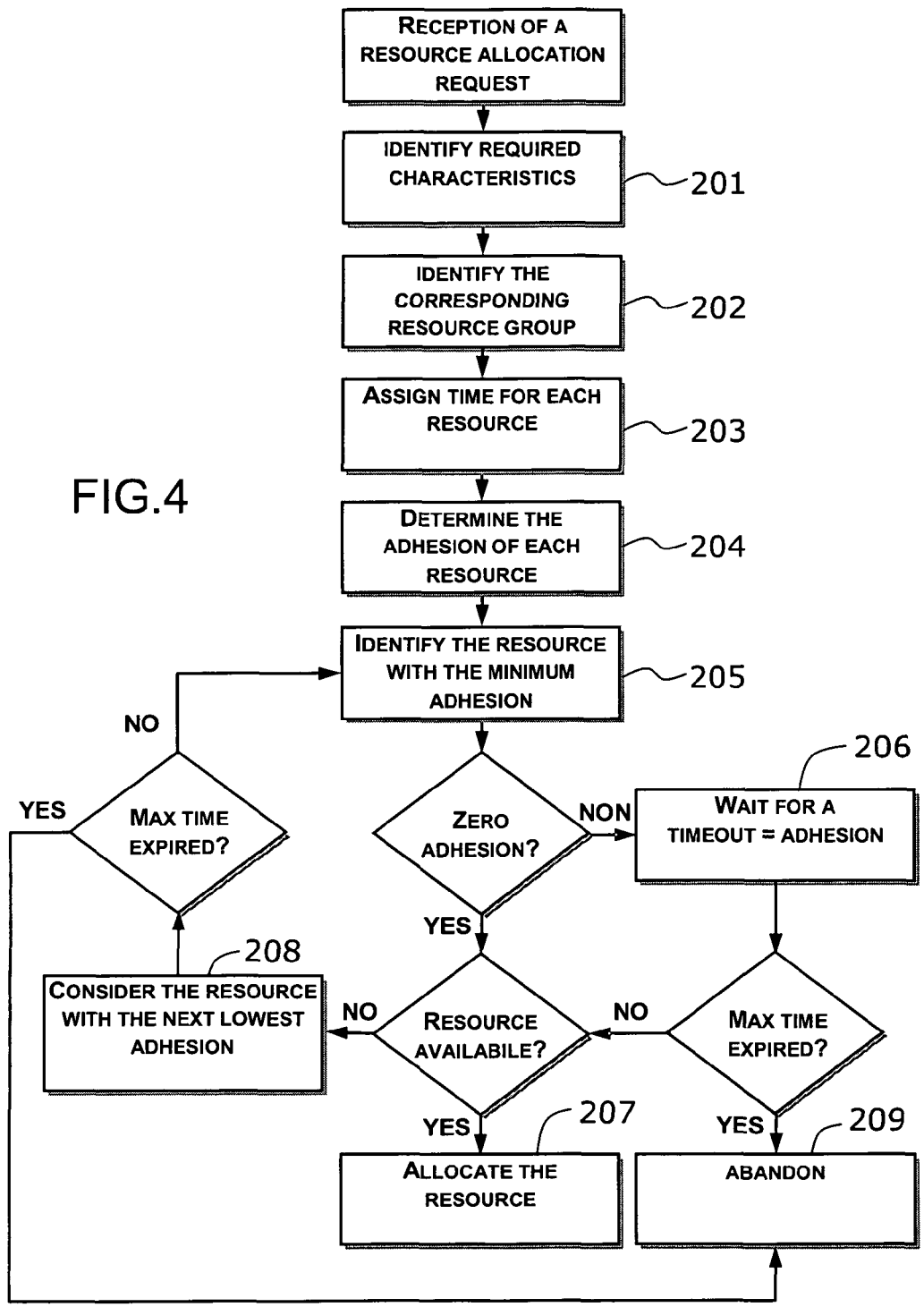
FIG. 4 is a diagram illustrating different steps in a method for allocating resources in application of the first resource management method illustrated on FIG. 2.

Resource Allocation (FIG. 4)

The resource management method described above may be applied to resource allocation, in the context (given as an example only) of a contact centre 1 like that described above, designed for use of the emergency medical service for persons. Resources are human agents 7 each with a number of predetermined characteristics, including medical skills.

A first operation 201 consists of starting from an allocation request that may be in the form of a call or message transmitted to the centre 1 (through the network 4 and the call server 3) by a customer 6 (such as a patient or a witness) to identify one or several characteristics for resources that could satisfy the request. In the context of a telephone call, this identification may be made using a pre-programmed interactive questionnaire to which the customer 6 must reply, for example using the numeric keys on his telephone to select a reply chosen among several choices. In the context of a computer message, this identification may be made using a form to be filled in by the customer.

The required characteristics may be identified within the call server 3, and a computer program comprising an instruction may be installed on the processor of this server for this purpose.

For example, assume that a person is the victim of a heart attack in the presence of a witness, who calls the emergency medical department (and in doing so becomes the customer for the purposes of this description) in order to get a person capable of providing at least first aid to the victim, to be sent to the site of the drama.

The required characteristics among the set of agent characteristics as identified in the centre 1, to assure that an agent is capable of replying to the request, are as follows in this example:
 cardiology skills,
 the hierarchical position,
 belonging to a cardiology department, and
 the travel time from the current location to the place of the event.

A second operation 202 then consists of identifying a group of agents with the required characteristics, among the various agents.

To continue the above example, assume that four agents have the required characteristics: Mark, Matthew, Luke and John.

A third operation 203 will consist of assigning a time to each agent, for each characteristic corresponding to the category to which he belongs.

A fourth operation 204 will then consist of using these times to calculate the adhesion of each agent, as illustrated in table 4.1 below.

TABLE 4.1

| | Skill in Cardiology | Hierarchical position | Belonging to the cardiology department | Travel time | Adhesion |
|---|---|---|---|---|---|
| Mark | 1 | Doctor | False | | |
| | 10 min | 2 min | 20 min | 10 min | 20 min |
| Matthew | 2 | Head nurse | True | | |
| | 2 min | 10 min | 0 min | 12 min | 12 min |
| Luke | 3 | Department head | True | | |
| | 0 min | 0 min | 0 min | 17 min | 17 min |
| John | 2 | Doctor | False | | |
| | 2 min | 2 min | 20 min | 2 min | 20 min |

The following operation 205 consists of identifying the agent with the lowest adhesion within the group. In the event, this is Matthew whose adhesion is 12 minutes.

Since the minimum adhesion is not zero, the next operation 206 consists of putting the request in waiting for a time less than or equal to the adhesion (which in this case is 12 min).

More precisely, in a normal situation (for example for mail order or an After Sales Service) in which waiting does not have any vital consequences, the waiting time may depend on the adhesion. On the other hand, in an emergency situation, it may be preferable to decorrelate the adhesion waiting time so as to obtain a resource allocation as quickly as possible. For example, the agent with the lowest adhesion may be allocated to the request immediately, regardless of his adhesion (provided that he is available).

If the agent with the lowest adhesion is available after expiration of the waiting time, the next operation 207 consists of allocating the agent to the request. In practice in this example, a message is sent to Matthew informing him of the situation and asking him to go to the place of the event. This message may be in the form of a spontaneous or automatic telephone call or an email such as an SMS. The availability of the agent may be checked continuously, or simply after expiration of the waiting time.

Note that the system may be designed to adapt to modifications that can affect agents in real time, concerning their characteristics and also their availability.

Thus, it is possible that at least one of the agents (including the agent who initially had the lowest adhesion) will change category during the waiting time. Any adhesion modifications will then be taken into account, the waiting time either being reduced if the adhesion of the agent already selected is reduced or assuming that an agent suddenly has a lower adhesion, or increased in the case in which the previously selected agent suddenly has an higher adhesion.

On the other hand, if the agent with the lowest adhesion is unavailable after expiration of the waiting time, the next operation 208 consists of considering the agent with the next lowest adhesion.

The operations that have just been described (identification of the agent with the lowest adhesion, put in waiting for a time less than or equal to the lowest adhesion, possible allocation of the agent if he is available, or if he is unavailable, consider the next agent) are then repeated for the agent with the next lowest adhesion, and so on until an agent with the lowest adhesion is available after expiration of the timeout, or until expiration of a predetermined maximum waiting time.

If no agent has been allocated to the resource after expiration of the maximum waiting time, an abandon operation 209 may occur, for example consisting of transferring the call from the customer to another department.

It is assumed that the minimum adhesion in the example given above is not zero. If this adhesion is zero, then the availability of the agent is immediately verified because in this case, this agent will be allocated to the request.

It is found from the above that if the adhesion measurement unit is time, it is possible to use it directly for resource allocation needs, for example (as we have seen) by assigning a waiting time to the value of the adhesion.

More generally, the use of homogenous time magnitudes to classify resources in each category facilitates sorting, classification and scheduling of resources. Time values representing categories to which resources belong are not necessarily fixed definitively. On the other hand, it may be preferable to be able to vary these values, particularly in order to refine the adhesion calculation.

Consider the example illustrated in table 2.6: we can see that if the agent does not belong to the cardiology department, the corresponding time is 20 min. Applied to the example described above (table 4.1), we can see that the adhesions calculated for agents not belonging to the cardiology department (Mark and John) are equal to the time corresponding to the lack of belonging to the cardiology department (20 min). This can increase the waiting time.

In other words, for a given characteristic, the correlation between firstly the category and secondly the corresponding time represents the importance assigned to this characteristic.

Therefore, in the case of a situation endangering the life of a person, the criteria used to make a correlation between a determined category and the corresponding time may be unsuitable: consequently, the possibility of modifying them should be envisaged if necessary.

In the event, it appears that by reducing the time corresponding to the <<false>> category for belonging to the cardiology department—which is equivalent to reducing the importance of this characteristic in comparison with the others, the adhesion value of the agent belonging to this category is also reduced.

For example, replacing the <<false>>=<<20 min>> correlation by the <<false>>=<<2 min>> correlation for the <<Belonging to the cardiology department>> characteristic, effectively reduces the impact of this characteristic on the calculation of adhesions in the example illustrated in 4.1, as shown in table 4.2, created using the same agents with the same characteristics:

TABLE 4.2

|  | Skills in Cardiology | Hierarchical position | Belonging to the cardiology department | Travel time | Adhesion |
|---|---|---|---|---|---|
| Mark | 1 | Doctor | False | 10 min | 10 min |
|  | 10 min | 2 min | 2 min |  |  |
| Matthew | 2 | Head nurse | True | 12 min | 12 min |
|  | 2 min | 10 min | 0 min |  |  |
| Luke | 3 | Department head | True | 17 min | 17 min |
|  | 0 min | 0 min | 0 min |  |  |
| John | 2 | Doctor | False | 2 min | 2 min |
|  | 2 min | 2 min | 2 min |  |  |

Note that the classification is modified. John is now the agent with the lowest adhesion. The impact on the waiting time is also important, because it is now less than or equal to 2 minutes.

EXAMPLE 2

Figure 5:
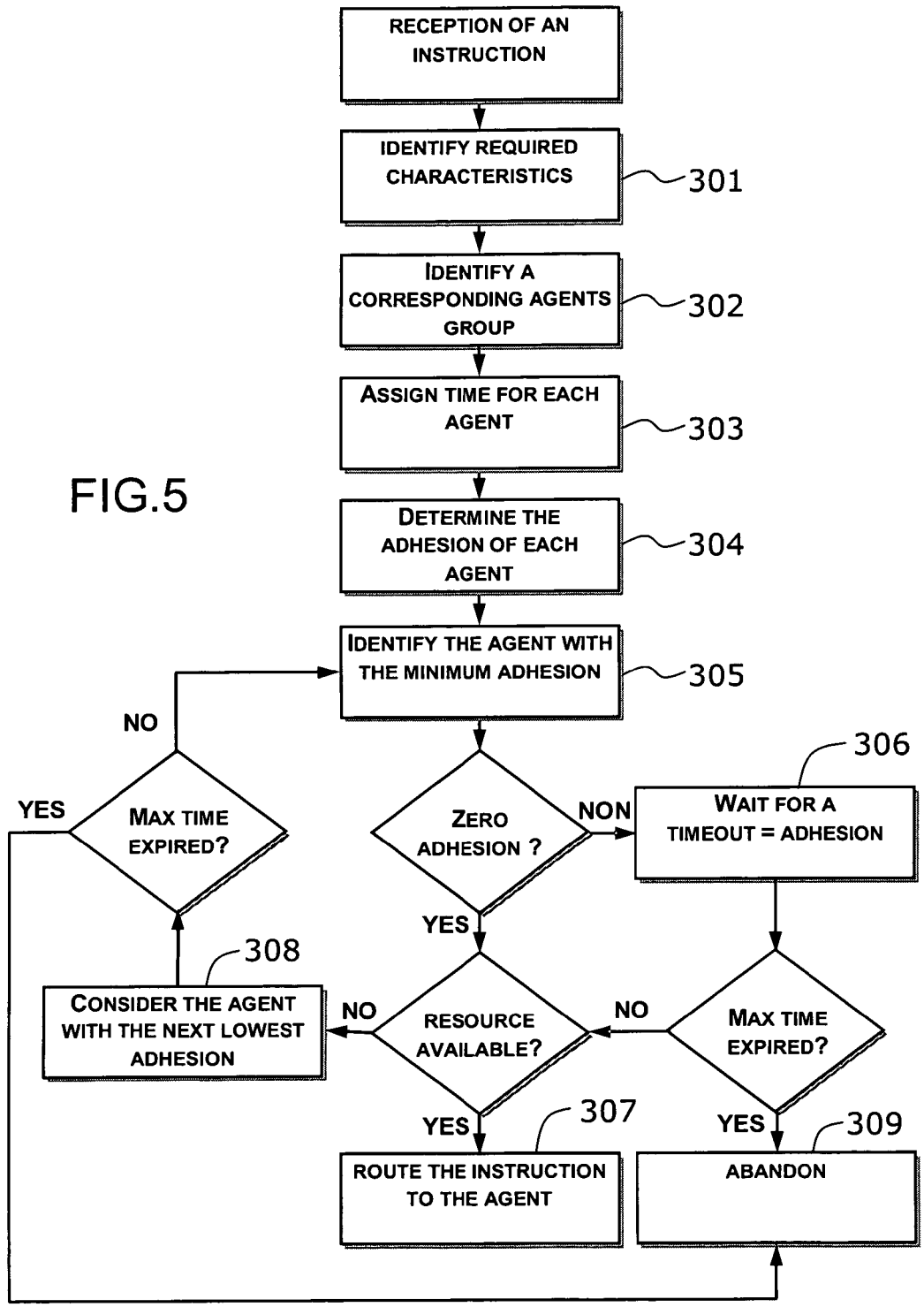
FIG. 5 is a diagram illustrating different steps in a method for routing an instruction in a contact centre, in application of the resource management method illustrated on FIG. 2.

Routing (FIG. 5)

The resource management method described above may also be applied to routing of instructions in the framework of a contact centre, for example for remote service to persons (such as an After Sales Service, mail order, telephone assistance, online forums, etc.). Resources are human agents, each comprising a number of predetermined characteristics, including specific technical skills.

A first operation 301 consists of starting from an instruction that may be in the form of a call or a message transmitted to the centre 1 by a customer 6 (for example who needs a service or advice), and identifying one or several characteristics for agents 7 who can follow-up the instruction, in other words in practice taking the caller in the case of a call, or receiving message to answer it later on.

As above, required characteristics may be identified in the same way as described above in example 1, in the context of a telephone call, using a pre-programmed interactive questionnaire to which the customer 6 must reply, for example by selecting a reply chosen among several proposals by using the numeric keys on his telephone; in the case of a computer message, through a form to be filled in by the customer 6.

For example, assume that a person subscribed to a telephone legal advice service calls the contact centre 1 to obtain contract advice in English.

In this example, the characteristics required for agents 7 who might correspond to the request, among the set of characteristics of agents 7, include the following:

skill in English,
belonging to a legal department,
skill in contract techniques, and
the hierarchical position.

A second operation 302 then consists of identifying a group of agents with the required characteristics, among all the agents.

In order to continue the above example, assume that four agents 7, Ian, Kevin, Adrian and Stephen, have the required characteristics:.

A third operation 303 consists of assigning a time corresponding to the category of the agent 7, for each characteristic of each agent 7.

A fourth operation 304 then consists of calculating the adhesion of each agent 7 from these times, as illustrated in table 5.1 below.

TABLE 5.1

|  | Skill in English | Belonging to the legal department | Skill in contract techniques | Hierarchical position | Ad-hesion |
|---|---|---|---|---|---|
| Ian | Beginner 15 min | True 0 min | Expert 0 min | Senior jurist 0 min | 15 min |
| Kevin | Experienced 5 min | False 20 min | Beginner 10 min | Junior jurist 10 min | 20 min |
| Adrian | Expert 0 min | True 0 min | Experienced 2 min | Experienced jurist 2 min | 2 min |
| Stephen | Fluent 1 min | False 20 min | Expert 0 min | Senior jurist 0 min | 20 min | a fifth operation 305 consists of identifying the agent with the lowest adhesion within the group thus formed. In the event this is Adrian, whose adhesion is 2 min.

A sixth operation 306 then consists of putting the instruction in waiting for a time less than or equal to the lowest adhesion, in the event 2 minutes.

A seventh operation 307, if the agent with the lowest adhesion is available at the end of the waiting time, is to route the instruction to the agent 7. In practice, in the case of a telephone call, the customer 6 is put into contact with Adrian. In the case of a computer message, the message will be sent to Adrian. The availability of the agent may be verified continuously, or simply after expiration of the waiting time.

Note that the system is designed to adapt to modifications that can affect agents in a real time, concerning their characteristics and their availability.

Thus, it is possible that at least one of the agents (including the agent who initially had the lowest adhesion) will change category during the waiting time. Any modifications to adhesion are then taken into account, the waiting time being either reduced if the adhesion of the previously selected agent reduces or if the agent suddenly has a lower adhesion, or increased if the previously selected agent suddenly has a higher adhesion.

If the agent with the lowest adhesion is unavailable at the end of the waiting time, the next operation 308 consists of considering the agent with the next lowest adhesion.

The operations that have just been described (identification of the agent with the lowest adhesion, put in waiting for a time equal to or less than the lowest adhesion, possible routing of the instruction to the agent if he is available or, if he is not available, consideration of the next agent in the group) are then repeated for the agent with the next lowest adhesion, and so on until an agent with the lowest adhesion is available at the end of the waiting time, or until expiration of a maximum predetermined waiting time.

It is assumed that the minimum adhesion in the example that has just been given is not zero. If this adhesion is zero, the availability of the agent will be verified immediately, and then if the agent is available, the instruction will be routed to the agent 7.

If no agent has been allocated to the resource at the end of the maximum waiting time, an abandon operation 309 may be performed, for example consisting of transferring the instruction to another department.

Note that time values representing the categories to which resources belong are not necessarily definitively fixed. On the other hand, it may be preferable to vary these values, particularly in order to refine the adhesion calculation.

Considering the example illustrated in table 2.7: we can see that the corresponding time if the agent 7 does not belong to the legal department is 20 minutes. Applied to the example described above (table 5.1), we can see that the adhesions calculated for agents not belonging to the legal department (Kevin and Stephen) are equal to the time corresponding to the lack of belonging to the legal department (20 min). This can increase the waiting time.

In other words, for a given characteristic, the correlation between firstly the category and secondly the corresponding time, represents the importance assigned to this characteristic.

In the event, it is found that reducing the time corresponding to the <<false>> category for belonging to the legal department (which is equivalent to reducing the importance of this characteristic in comparison with the others), the adhesion value of an agent belonging to this category is also reduced.

As an example, replacing the <<false >>=<<20 min>> correlation by the <<false >>=<<2 min )) correlation for the <<belonging to the legal department>> characteristic considerably reduces the impact of this characteristic on the calculation of adhesions in the example illustrated in table 5.1, as is shown on table 5.2 created from the same agents with the same characteristics:

TABLE 5.2

|  | Skill in English | Belonging to the legal department | Skill in contract techniques | Hierarchical position | Ad-hesion |
|---|---|---|---|---|---|
| Ian | Beginner 15 min | True 0 min | Expert 0 min | Senior jurist 0 min | 15 min |
| Kevin | Experienced 5 min | False 2 min | Beginner 10 min | Junior jurist 10 min | 10 min |
| Adrian | Expert 0 min | True 0 min | Experienced 2 min | Experienced jurist 2 min | 2 min |
| Stephen | Fluent 1 min | False 2 min | Expert 0 min | Senior jurist 0 min | 1 min |

Note that the classification is modified, Stephen is now the agent with the lowest adhesion. The impact on the waiting time is also important, which is now less than 1 min.

The invention is not limited to the examples that have just been described, and various variants could be envisaged.

In particular, we have seen in examples 1 and 2 that the availability of a resource may be verified continuously or at the end of the waiting time.

As a variant, the availability of a resource may be considered as a characteristic in itself, the value in the corresponding category being equal to the time estimated before the resource becomes available. For example, if the resource is available immediately, this value is equal to 0 minutes. In this respect, the system may comprise means of evaluating the availability of resources not only at the present time but also in the future. When resources are human agents who are inherently mobile, these means may for example be in the form of a computer program using agent positioning data (including the geographic position, direction and travel speed), to calculate the estimated arrival time at which the agent is considered to be available on the site, for example at his workstation.

It may also be arranged that in the case in which resources are humans, the allocation of an agent to a request (as in example 1) or routing of an instruction to the agent (as an example 2) is preceded or accompanied by a message (voice or text) providing data concerning the instruction request (for example the customer identity, the reasons for the request or the instruction). This message may be pronounced on a loud speaker, for example from a speech synthesis module, or it may be displayed on a graphic interface of the agent's terminal.

Furthermore, if it is planned to put the instruction in waiting for a time equal to (or less than) the lowest adhesion, particularly in example 2, and then if the corresponding agent is unavailable and to consider the agent with the next lowest adhesion, as a variant it would be possible to send a request simultaneously (such as a request to start communication) to a first selection of agents (for example three agents) with the lowest adhesions within their group, this instruction being put in waiting until one of the agents in this first selection follows up the request. This function may also be suitable for cases in which agents have equal adhesions, the instruction being routed to the agent who answers the request first. If an agent rejects the request, he will be eliminated from the group; if the request is not accepted by any agent in the first selection, a second selection will be made, and operations will be repeated until the request is accepted by an agent, or until expiration of a predetermined timeout after which the instruction is routed to another service or is rejected, or until the customer abandons it.

The use of homogenous time magnitudes to sort resources in each category is a major advantage of the methods described above; it very much facilitates sorting, classification and scheduling of resources.

More precisely, due to this time nature of the adhesion measurement unit, it is possible to use it directly for resource allocation needs (as in example 1) or for routing (as in example 2), by assigning a waiting time to the value of the adhesion.

The invention claimed is:
1. Contact centre (1) comprising:
a resource database (9) to memorize the corresponding identities of a number of resources (7) each with several characteristics, and for each characteristic of each resource, to memorize a predetermined category from a plurality of predetermined categories to which the resource considered belongs;
means (3) of receiving an instruction from a customer (6);
means (3) of starting from this instruction to identify one or several characteristics required for a resource (7) to be selected among the plurality of resources (7);
means (3) of identifying a group of resources (7) with the required characteristic(s) among the resources (7);
means (3) of selecting a resource within this group, as a function of the categories memorized in the database;
and means (3, 5) of routing the instruction to the resource thus selected;
wherein:
the resource database (9) comprises means of memorizing a respective time representing each respective category,
the means of selecting a resource within said group comprise:
means of assigning a magnitude in time called the adhesion and equal to the longest of the characteristic times of each resource (7), to each resource (7),
and means of selecting a resource within said group as a function of the adhesions thus assigned.
2. Contact centre (1) according to claim 1, characterized in that the means of selecting a resource within said group as a function of the adhesions thus assigned comprise means for selecting the lowest adhesion within said group.
3. Contact centre (1) according to claim 2, characterized in that the means (3, 5) of routing the instruction to the resource thus selected comprise:
means for sorting resources into order (105') of increasing adhesion,
and means for waiting (206) and
allocating (207) the resource with the lowest adhesion to said customer, if this resource is available before expiration of a waiting time equal to the lowest adhesion,
or allocating (208) the resource with the next lowest adhesion to said customer, if the resource with the lowest adhesion is not available after expiration of the waiting time equal to the lowest adhesion.

* * * * *